United States Patent

[11] 3,615,548

| [72] | Inventor | John Charles Firestine<br>South River, N.J. |
|---|---|---|
| [21] | Appl. No. | 758,099 |
| [22] | Filed | Sept. 6, 1968 |
| [45] | Patented | Oct. 26, 1971 |
| [73] | Assignee | E. I. du Pont de Nemours and Company<br>Wilmington, Del. |

[54] PHOTOGRAPHIC ELEMENTS BEARING LIGHT-ABSORBING LAYERS CONTAINING AN OXAZOLE STYRYL DYE AND A METAL CHELATE OF A FUCHSONE DYE
4 Claims, No Drawings

| [52] | U.S. Cl. | 96/84 R |
|---|---|---|
| [51] | Int. Cl. | G03c 1/84 |
| [50] | Field of Search | 96/84 |

[56] References Cited
UNITED STATES PATENTS

| 1,879,537 | 9/1932 | Schneider | 96/84 |
|---|---|---|---|
| 1,994,876 | 3/1935 | Schneider et al. | 96/84 |
| 2,350,090 | 5/1944 | Beilenson | 96/84 |
| 3,005,711 | 10/1961 | Burgardt et al. | 96/84 |
| 3,018,177 | 1/1962 | Geiger et al. | 96/84 |
| 3,182,029 | 5/1965 | Chu et al. | 96/84 X |
| 3,406,069 | 10/1968 | Overman | 96/84 X |
| 3,423,207 | 1/1969 | Heseltine et al. | 96/84 |

*Primary Examiner*—Ronald H. Smith
*Attorney*—Lynn Barratt Morris

ABSTRACT: A photographic element comprised of a support, a light-sensitive silver halide layer, and a filter layer or antihalation layer comprising an organic binder, an oxazoline styryl dye, and metal chelates of fuchsone-type dyes. The dye combinations are nonmigratory, stable, photographically inactive, and discharge completely in reversal processing.

PHOTOGRAPHIC ELEMENTS BEARING LIGHT-ABSORBING LAYERS CONTAINING AN OXAZOLE STYRYL DYE AND A METAL CHELATE OF A FUCHSONE DYE

BACKGROUND OF THE INVENTION

1. Field of the Invention

This invention relates to coloring materials for photographic filter layers or antihalation layers. More particularly this invention relates to combinations of coloring materials or dyes in antihalation underlayers of photographic reversal films.

2. Description of the Prior Art

The Prior Art describes styryl dyes and fuchsone-type dyes used alone and in combination with other dyes in antihalation layers for photographic film. V. Chu et al. U.S. Pat. No. 3,182,029 covers the use of styryl dyes in combination with anionic polymers as blue filter layers for color reversal films. W. Schneider U.S. Pat. No. 1,879,537 makes a broad statement to the effect that antihalation layers may contain dyes in combination with fuchsone dyes. B. Beilenson U.S. Pat. No. 2,350,090, W. Schneider U.S. Pat. No. 1,994,876, L. Burgardt et al. U.S. Pat. No. 3,005,711, and J. Geiger U.S. Pat. No. 3,018,177 all disclose that fuchsone-type dyes can be used in a mixture with other dyestuffs in antihalation layers.

Metal chelates of triphenylmethane dyes have been used in gelatin layers to provide halation protection. See assignee's Patent application to J. D. Overman, Ser. No. 461,200 filed June 3, 1965 U.S. Pat. No. 3,406,069, Oct. 15, 1968.

Although the metal chelates and styryl dyes have been used alone and in combination with other dyes, they have not been successfully combined to give nonmigratory dischargeable antihalation materials in antihalation layers of reversal films.

Dyes used for providing halation protection must, of necessity, possess several characteristics, without which they are in some degree unsatisfactory. The dye must be nonmigratory from the layer in which it is incorporated, inert with respect to any chemicals in the light-sensitive layer, readily discharged in processing solutions, provide good spectral coverage in the required absorption range, and it must not adversely affect the processing baths. Most of the prior art coloring materials are deficient in one or more of the above characteristics.

SUMMARY OF THE INVENTION

This invention relates to styryl dyes used in combination with metal chelates of triphenylmethane dyes to provide an antihalation layer for photographic film, said dye combination being nonmigratory, stable, photographically inactive, and irreversibly dischargeable in reversal processing.

The element of the invention comprises a support, a light-sensitive silver halide layer, and an antihalation layer composed of an organic binder, a styryl dye of high molecular weight, and metal chelates of fuchsone dyestuffs containing at least one carboxyl group ortho to a quinone or hydroxyl group in at least one of the benzene rings of the triphenylmethane structure.

In a preferred embodiment of the present invention, the dyes are incorporated into an antihalation layer between the film base and the light sensitive layer. The dyes can also be incorporated directly into the light-sensitive layer or in a separate layer on the back surface of the photographic film.

An object of the present invention is to prepare dye combinations that give good spectral coverage in the visible region. A further object is to provide a process for combining dyes which are nonmigratory and irreversibly dischargeable in processing. Another object is to prepare antihalation layers for reversal films which are composed of water-insoluble oxazoline styryl dyes of high molecular weight and metal chelates of triphenylmethane dyes that are dispersible in aqueous organic colloid media. Still other objects will be apparent from the foregoing description.

DESCRIPTION OF THE INVENTION

In general, this invention embodies a combination of water-insoluble oxazoline styryl dyes with metal chelates of triphenylmethane dyes, dispersed in an aqueous organic colloid binder, in antihalation layers of photographic elements, especially reversal films.

The styryl dyes fall within the general formula:

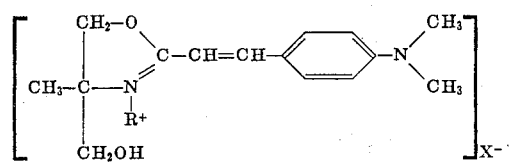

where R is an alkyl or aralkyl having from one to 20 carbon atoms, and preferably an alkyl of eight to 20 carbon atoms, and $x^1$ is the negative radical of an acid, e.g., suitable alkyl radicals include methyl, ethyl, n-butyl, n-hexyl, n-dodecyl, and n-octadecyl. Suitable aralkyl radicals include benzyl and menaphthyl.

The metal chelates of triphenylmethane dyes, used in combination with the styryl dyes, are described in U.S. Pat. No. 3,406,069. Suitable specific dyes are given in said application, and they have the formula:

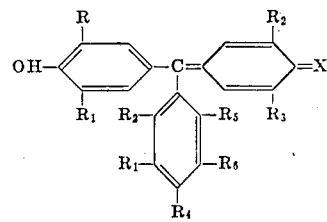

where X represents oxygen or N<; R, $R_1$, $R_2$, $R_3$ represents H, lower alkyl, alkoxy, carboxyl, amido, and halogen groups; $R_4$ represents H, alkyl, alkoxy, carboxy, amino, substituted amino, e.g., phenyl-, dimethyl-, diethylamino, methylcyanoethyl, hydroxy, amido, and the group.

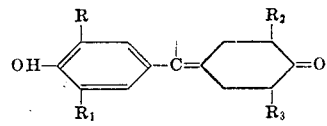

Wherein the R's have the meanings given above, and $R_5$, $R_6$, $R_7$, and $R_8$ represent H, halogen, carboxyl, e.g., acetamido and stearylamido.

The alkyl radicals have one to four carbon atoms, and suitable alkyl radicals include those listed above. The alkoxyl radicals can have one to four carbons, including methoxy, ethoxy, isopropoxy and n-butoxy.

The fuchsone dyes one to twenty-one, inclusive, shown in the Overman patent U.S. Pat. No. 3,406,069 contain at least one carboxyl group ortho to a quinone group or a hydroxyl group in at least one of the benzene rings of the triphenylmethane structure.

Although gelatin is the preferred agent for dispersing the dyes, other natural or synthetic water-permeable colloid-binding agents may be used alone or in admixture such as albumin, agar-agar, polyvinyl alcohol and its water-soluble derivatives, e.g., partially hydrolyzed polyvinyl acetates, polyvinyl ethers, and acetates containing a large number of intra linear—$CH_2CHOH$—groups; hydrolyzed interpolymers of vinyl acetate and unsaturated addition polymerizable compounds such as maleic anhydride, acrylic and methacrylic acid ethyl esters, and styrene. Suitable colloids of the last-mentioned type are disclosed in U.S. Pat. Nos. 3,376,322; 2,276,323; and 2,347,811. The useful polyvinyl acetals include polyvinyl butyraldehyde acetals and polyvinyl sodium o-sulfobenzaldehyde acetals. Other useful colloid-binding agents include the poly-N-vinyl lactams of Bolton U.S. Pat. No. 2,495,918, the hydrophilic copolymer of N-acrylamide alkyl betaines described in Shacklett U.S. Pat. No. 2,833,050, and hydrophilic cellulose ether esters.

The film base to which the antihalation layer is applied is the usual photographic film base, as for instance the cellulose esters, e.g., cellulose acetate, or polyesters, e.g., polyethylene terephthalate.

The water-insoluble oxazoline yellow styryl dye is the only dye found to be compatible with the metal chelates to give a neutral antihalation layer exhibiting all of the desired characteristics. Other yellow dyes tested in combination with the chelates, such as those described in B. Gaspar U.S. Pat. No. 2,274,782, do not disperse well and are unstable in combination. The above-mentioned neutral formulation exhibits antihalation protection over the entire visible spectrum, that is to say from about 400 m$\mu$ to about 700 m$\mu$, with a gel-coating weight of only about 10 mg./dm.$^2$.

The concentration of the dye in the layer may vary considerably depending upon the product in which the filter layer is to be used. The coating weight of the dye when used in a filter layer or antihalation layer may be readily adjusted to provide the optical density necessary for the specific use.

After addition of the styryl dye to the colloidal gel solution, the pH is adjusted above 10, a condition that is useful for formation of the metal chelate dyes. A final pH of about 6 facilitates application of the antihalation layer and the emulsion coating to the support.

The invention will now be illustrated further by the following specific examples, but these examples are not intended to limit the scope of the invention except as defined by the claims.

EXAMPLE I

An aqueous gelatin solution was prepared by adding 144 g. of pigskin gelatin to 5,040 ml. of water. The solution was allowed to swell for 60 min. and then dissolved at 40° C. After adjusting the pH to 10.6 by addition of about 12 ml. of 3N sodium hydroxide, 6 g. of Chrome Azurol S (C.I. Mordant Blue 29) and 4.8 g. of Chrome Violet CB (C.I. Mordant Violet 17) were stirred into the solution. Six grams of potassium aluminum sulfate dissolved in 150 ml. of water was added, and the pH was adjusted to 6.1 by addition of 5 percent acetic acid. Into this solution was charged 3.6 g. of the oxazoline styryl dye,

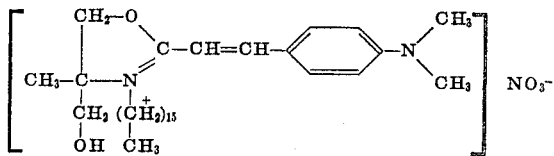

dissolved in 60 ml. of ethanol.

This was followed by addition of 81 ml. of a 1 percent dioctyl sodium sulfosuccinate solution. After thoroughly mixing, the gelatin composition was coated onto a clear film support comprising cellulose triacetate with a conventional gelatin subbing layer. The gelatin coating weight was 13 mg./dm.$^2$. The filter layer obtained had an optical density of 0.23 when measured at a wavelength of 450 M$\mu$, 0.23 at 550 m$\mu$, and 0.20 at 600 m$\mu$. The filter layer was overcoated with a high-speed, large-grain gelatino-silver iodobromide emulsion comprising 2.5 mole per cent silver iodide and 97.5 mole per cent silver bromide, applied at a coating weight of about 96 mg./dm.$^2$.

Immersion of the film in the following black and white reversal developer discharged the color completely, leaving a film devoid of stain:

| Developer Solution | |
|---|---|
| Water | 2.4 l. |
| Sodium sulfite (anhydrous) | 1.5 g. |
| Sodium hexametaphosphate | 1.5 g. |
| N-methyl-p-aminophenol hydrosulfate | 1.8 g. |
| Hydroquinone | 60 g. |
| Potassium bromide | 12 g. |
| Sodium thiocyanate | 12.6 g. |
| Sodium hydroxide | 60 g. |

Sufficient water was added to give a final volume of 3 liters.

There was no indication that the dyes had migrated to adjacent layers during the manufacture of the film.

The Br$^1$ analogue of the styryl dye may be substituted for the nitrate giving the same spectral coverage and the same satisfactory results. EXAMPLE II A solution of 12 g. of pigskin gel in 420 ml. of water was prepared and allowed to swell for 1 hour. After dissolving the gel at 40° C., enough 3N sodium hydroxide was stirred into the solution to raise the pH to 10.60. Then 1.5 g. of Chrome Violet CB (C.I. Mordant Violet 17) and 0.6 g. of potassium aluminum sulfate dissolved in 25 ml. of water was stirred in. The PH was adjusted to 6.1 with 5 percent acetic acid, and 0.5 g. of the styryl dye used in example I dissolved in 10 ml. of ethanol was added to the gel solution with good stirring. The pH was adjusted to a final value of 6.1 by addition of 1 percent dioctyl sodium sulfosuccinate. The colored gelatin solution was coated on a clear film support of polyethylene terephthalate, giving a gelatin coating weight of about 10 mg./dm.$^2$. Measurement of the optical density gave a reading of 0.41 at 440 m[2 absorption peak and 0.34 at 540 m$\mu$. The antihalation layer was overcoated with a gelatino-silver iodobromide emulsion comprising 1.8 mole percent silver iodide and 98.2 mole per cent silver bromide, applied at a coating weight of about 92 mg./dm.$^2$.

Immersion of the coated film in the black and white developing solution of example I discharged the dye underlayer.

The Br$^1$ styryl dye can be substituted for the nitrate dye without any loss in halation protection.

EXAMPLE III

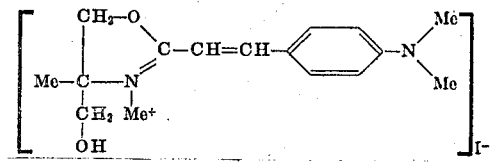

The oxazoline styryl dye appearing above can be successfully combined with metal chelates of triphenylmethane dyes to give a neutral dye formulation. Unlike the styryl dyes of example I, this dye is migratory.

A solution of 24 g. of pigskin gel in 840 ml. of water was prepared. After a swelling period of 1 hour, the gel was dissolved at 40° C., and 2 ml. of 3N sodium hydroxide was added. To the gel solution was charged 1 g. of Chrome Azurol S (C.I. Mordant Blue 29), 0.8 g. of Chrome Violet CB (C.I. Mordant Violet 17), and 1 g. of potassium aluminum sulfate in 25 ml. of water. A solution of 0.6 g. of the above-mentioned styryl dye dissolved in 10 ml. of ethanol was added, followed by 13.5 ml. of a 10.3 percent solution of saponin in ethanol and water. The solution was coated on a cellulose triacetate film support, with a gelatin-coating density of about 15 mg./dm.$^2$. The film exhibited an optical density of 0.32 at 440 m$\mu$, 0.25 at 550 m$\mu$, and 0.17 at 600 m$\mu$. The antihalation layer was overcoated with the silver halide emulsion of example I, with a coating weight of 95 mg./dm.²

The dyes discharged readily in the black and white reversal developing solution of example I.

The dye combinations dispersed in aqueous organic colloid media fulfill all of the requirements of a good antihalation layer. Although many dyes exhibit a number of these desirable characteristics, few possess all of them. The preferred dye combinations of this invention: (1) are nonmigratory, i.e., will not diffuse into subsequently coated layers, (2) are irreversibly discharged in black and white reversal film developer solution without having any deleterious effect on the solutions, (3) do not affect sensitometry, (4) are water-insoluble and thus will not discharge when washed in aqueous solutions, (5) are stable when dispersed in colloid binder, permitting the film to be stored for long periods of time, (6) give good spectral coverage, absorbing throughout most of the visible region, (7) do not fog the film, and (8) are inert with respect to any chemicals in the light-sensitive layer.

The embodiments of the invention in which an exclusive property or privilege is claimed are defined as follows:

1. A photographic element comprising a support, a light-sensitive silver halide layer, and a light-absorbing layer comprising an organic macromolecular binding agent having dispersed therethrough an oxazoline styryl dye of the formula:

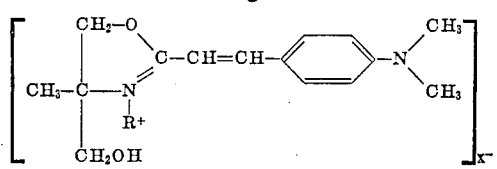

wherein R is alkyl or aralkyl of one to 20 carbon atoms, and $x^1$ is the negative radical of an acid, and at least one metal chelate of a fuchsone dye containing at least one carboxyl group, in a position ortho to a quinone or hydroxyl group in at least one of the benzene rings of the triphenylmethane structure of said dye.

2. An element according to claim 1, wherein said binding agent is a water-permeable organic colloid.

3. An element according to claim 1, wherein said support is transparent to actinic radiation and the light-absorbing layer is on the surface of the support opposite from the silver halide layer and absorbs radiation to which the silver halide is sensitive.

4. An element according to claim 1, wherein said support is transparent to actinic radiation and the light-absorbing layer is on the support contiguous with the silver halide layer and absorbs radiation to which the silver halide is sensitive.